UNITED STATES PATENT OFFICE.

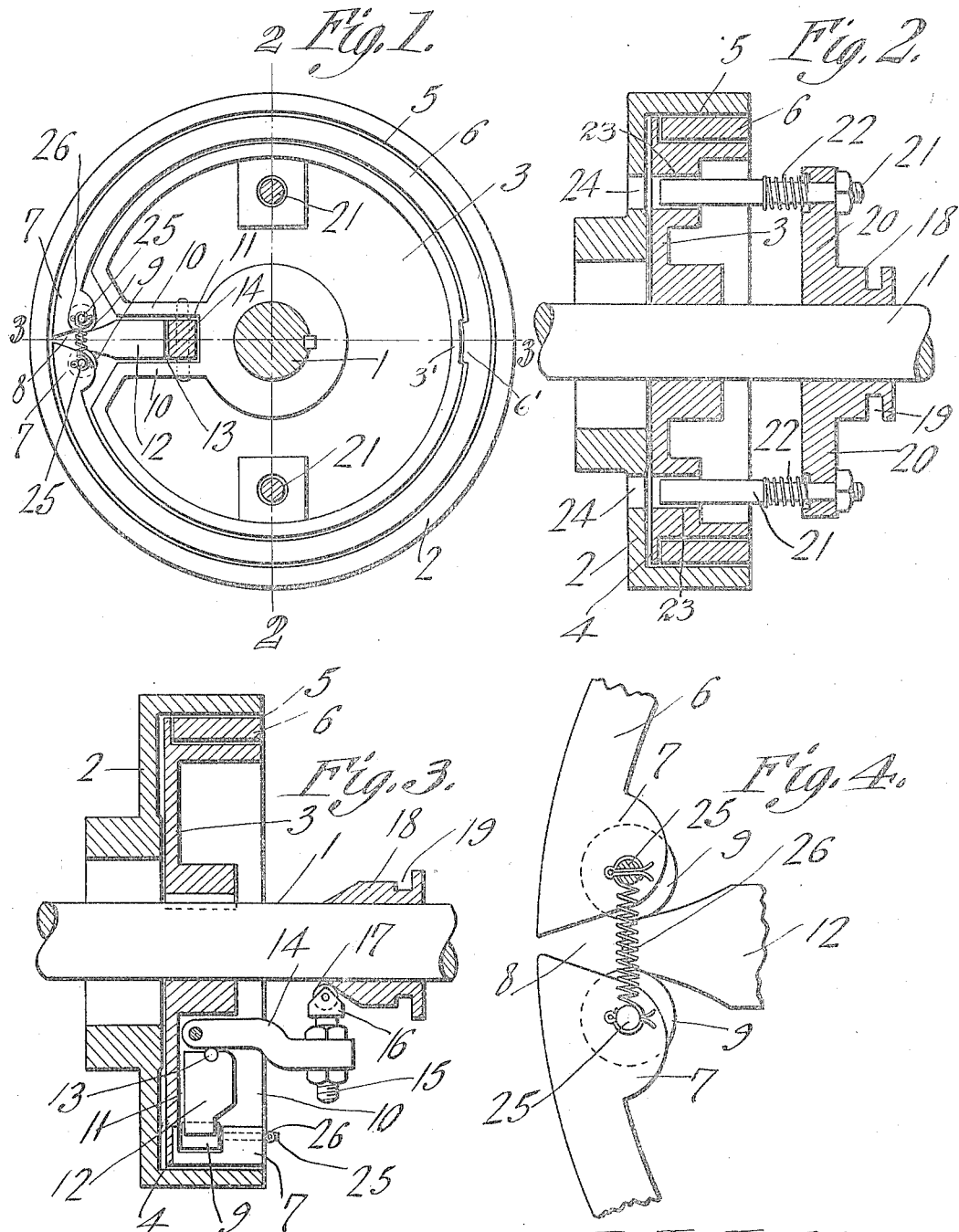

DANIEL L. LOTT, OF TIFFIN, OHIO, ASSIGNOR TO THE LOOMIS MACHINE CO., OF TIFFIN, OHIO.

CLUTCH.

1,257,718.      Specification of Letters Patent.      Patented Feb. 26, 1918.

Application filed January 24, 1917, Serial No. 144,201. Renewed January 16, 1918. Serial No. 212,150.

*To all whom it may concern:*

Be it known that I, DANIEL L. LOTT, a citizen of the United States, residing at Tiffin, in the county of Seneca and State of Ohio, have invented a new and useful Clutch, of which the following is a specification.

This invention relates to clutches, one of its objects being to provide a clutch utilizing an expansible friction element and supplemental means whereby, in the event of the failure of said friction element to properly act, the two parts of the clutch will be secured together.

A further object is to provide a clutch, the operating parts of which are provided with anti-friction elements whereby it becomes impossible for any of the mechanism to become hung and whereby friction between the parts during the operation of the clutch is reduced to the minimum.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a vertical transverse section through the clutch and showing the drum member and other parts in elevation.

Fig. 2 is a section on line 2—2 Fig. 1.

Fig. 3 is a section on line 3—3 Fig. 1.

Fig. 4 is a detail view of a portion of the actuating wedge and adjacent parts.

Referring to the figures by characters of reference 1 designates a shaft on which the outer or drum member 2 of the clutch is mounted for rotation. The clutch member 3 is keyed or otherwise secured to the shaft 1 and rotates within the member 2, this clutch or head being provided with an annular flange 4 at its inner side while an annular space 5 is formed between the head 3 and the member 2. Seated within this space 5 is a friction ring 6 which normally grips the head 3 and has its ends enlarged, as at 7 and diverging to form a substantially wedge-shaped recess 8. Journaled within the enlargements 7 are anti-friction rollers 9.

Formed on the head 3 adjacent the enlargements 7 are inwardly extending webs 10 forming a recess or socket 11 therebetween and slidably mounted within this socket is a wedge 12 the outer or small end of which normally contacts with the rollers 9. The inner or butt end of the wedge 12 has an anti-friction roller 13 projecting therefrom.

A smaller recess 3' is formed in the periphery of the member 3, the recesses 11 and 3' being diametrically opposed.

Pivotally mounted between the webs 10 and between the hub of the head 3 and the wedge 12 is a lever 14 normally bearing against the roller 13 and provided at its outer or free end with a screw threaded stem 15 adjustably mounted within the lever and extending inwardly toward the shaft 1. The inner end of this stem has a head 16 within which is mounted an anti-friction roller 17.

A conical sleeve 18 is slidably mounted on the shaft 1 and has an annular channel or groove 19 adapted to be engaged by a shifting lever, not shown. This sleeve has oppositely extending arms 20 and slidably mounted within each arm is a coupling pin 21 provided with a spring 22 whereby the pin is held normally projected into an opening 23 formed within the head 3. The pins 21 do not normally extend entirely through the head 3 but are positioned as shown in Fig. 2. The drum member 2 has openings 24 any one of which is adapted to be brought into register with any one of the openings 23 during the rotation of the head 3 relative to the drum 2. The pins 25 on which the rollers 9 are journaled, are anchored against rotation and are connected by a spring 26 which serves to draw the ends of the ring 6 toward each other, thus to insure release from the member 2 when the wedge is retracted.

The ring 6 has an intermediate projection 6' which is adapted to extend into the recess 3', thus to hold the friction ring 6 against displacement relative to the adjacent parts.

It will be understood of course that one of the clutch members is free to rotate relative to the other clutch member under ordinary conditions. When it is desired to couple together the two clutch members, the sleeve 18 is shifted longitudinally so that the conical end thereof will come against the roller 17 and thus shift the lever 14 radially. Consequently, the said lever will push against the roller 13 and force the wedge 12 radially against the rollers 9. This will result in the expansion of the friction ring 6 which will bind upon the inner surface of the drum 2 and couple the two clutch members. During the movement of the sleeve 18 toward the head 3, the pins 21 will be pushed longitudinally and, should the friction ring 6 fail to act properly, the pins 21 will come against the inner surface of the drum 2, thus compressing the springs 22 until said pins are brought ultimately oposite certain of the openings 24 whereupon they will spring into said openings and thus operate to couple the two clutch members positively.

What is claimed is:—

A clutch including inner and outer clutch members mounted for rotation, said inner member having an annular flange at one side thereof, said inner member being formed with diametrically opposed peripheral recesses, a wedging element slidably mounted within one of the recesses, a wedge actuating lever pivotally mounted within said recess, an expansible friction ring mounted between the peripheral portions of the inner and outer clutch members and having an intermediate projection seated in one of the recesses, the ends of said ring being arranged adjacent the wedge in the other recess, pins within the ends of the friction ring, anti-friction rollers journaled thereon, said wedge being normally positioned to enter between the rollers, a spring connection between the pins, and means for actuating the lever during the rotation of the inner clutch member to project the wedge between the rollers and expand the spring and clutch ring.

In testimony that I claim the foregoing as my own, I have hereto affixed my signature in the presence of two witnesses.

DANIEL L. LOTT.

Witnesses:
HARRY TAGGART,
L. A. SMITH.